(12) United States Patent
Busenbender (10) Patent No.: US 6,905,791 B2
(45) Date of Patent: Jun. 14, 2005

(54) FUEL CELL SYSTEM AND METHOD OF OPERATION IN WHICH TEMPERATURES IN THE FREEZING RANGE OF WATER CAN OCCUR

(75) Inventor: Ilona Busenbender, Rheinbreitbach (DE)

(73) Assignee: General Motors Corporation, Detroit, MI (US)

( * ) Notice: Subject to any disclaimer, the term of this patent is extended or adjusted under 35 U.S.C. 154(b) by 172 days.

(21) Appl. No.: 10/210,187

(22) Filed: Aug. 1, 2002

(65) Prior Publication Data

US 2003/0039870 A1 Feb. 27, 2003

(30) Foreign Application Priority Data

Aug. 2, 2001 (DE) .......................................... 101 37 847

(51) Int. Cl.[7] ................................................. H01M 8/00
(52) U.S. Cl. ............................ 429/13; 429/12; 429/17; 429/22
(58) Field of Search ............................ 429/12, 13, 17, 429/22

(56) References Cited

U.S. PATENT DOCUMENTS

| 6,068,941 A | 5/2000 | Fuller et al. .................. 429/13 |
| 6,638,650 B1 * | 10/2003 | Bailey et al. .................. 429/13 |
| 2002/0006534 A1 * | 1/2002 | Wilkinson et al ............. 429/13 |

FOREIGN PATENT DOCUMENTS

| DE | 19929732 | 1/2000 |
| DE | 19928068 | 12/2000 |
| JP | 10223249 A | 8/1998 |
| JP | 10-223549 | 10/1998 |
| WO | WO97/48142 | 12/1997 |
| WO | WO01/08246 | 2/2001 |

OTHER PUBLICATIONS

German Search Report.

* cited by examiner

Primary Examiner—Dah-Wei Yuan
(74) Attorney, Agent, or Firm—Cary W. Brooks (57) ABSTRACT

A method and apparatus for the operation of a fuel cell system to avoid the freezing of water resident in one or more fuel cells during periods of system inactivity. Each fuel cell includes at least an anode, a cathode and a membrane configured to establish electrolyte communication between reaction products formed at the anode and cathode. During fuel cell system operation, a portion of the water formed remains within the fuel cell; to avoid having the water freeze and inhibit subsequent system operation, a chemical compound introduced into the fuel cells mixes with the water still resident within the fuel cell to lower the temperature upon which the onset of water freezing occurs. The chemical compound can be introduced alone under pressure in the vapour phase, or in combination with the fuel, the incoming oxygen or an inert gas. In addition, system is configured such that the chemical compound can be introduced at numerous different locations.

34 Claims, 6 Drawing Sheets

FUEL CELL SYSTEM AND METHOD OF OPERATION IN WHICH TEMPERATURES IN THE FREEZING RANGE OF WATER CAN OCCUR

This application claims priority to German application No. 10137847.5, filed Aug. 2, 2001.

TECHNICAL FIELD

The present invention relates generally to an apparatus and method of operating a fuel cell system, and more particularly to a fuel cell system wherein a chemical compound is selectively introduced into the system such that freezing of fuel cell reaction products is avoided.

BACKGROUND OF THE INVENTION

The interest in fuel cell systems is in its ascendancy, due in part to the ability of such systems to provide clean, reliable power for various applications that require the production of electricity or related useful power. In a typical fuel cell configuration, an electrolyte is sandwiched between electrodes (specifically, an anode and a cathode) such that positive ions generated at the anode flow through the electrolyte and react with ions generated at the cathode, while current generated by the flow of free electrons produced at the anode can be used to power one or more external devices. Some fuel cells require the presence of a catalyst material to promote the formation of positive and negative ions on the anode and cathode, respectively. In addition, by stacking individual fuel cells relative to one another, more powerful systems can be built.

In many fuel cell systems, hydrogen or a hydrogen-rich gas is supplied through a flowpath to the anode side of a fuel cell while oxygen (such as in the form of atmospheric oxygen) is supplied through a separate flowpath to the cathode side of the fuel cell. These flowpaths route the supply of gaseous fuel and oxygen to their respective porous electrodes to ensure that the gases come into contact with the catalyst material disposed on or adjacent the electrodes. After the gaseous fuel and oxygen are routed through their respective flowpaths and pass through the interstices of corresponding porous electrodes, they encounter a layer of catalyst. Upon contact with the catalyst on the anode, the hydrogen is ionized and migrates through the membrane situated between the anode and cathode of each fuel cell. The ionized hydrogen then combines with oxygen that has been ionized at the cathode. Together, the ionized hydrogen and oxygen form water as a non-polluting reaction product. Supplemental humidifying devices also introduce water into the fuel cell structure. The presence of this water can be a problem when the fuel cell system is switched off in an environment where the temperature falls below the freezing point of water, as the moisture present therein could solidify and block the fuel and oxygen flow routes, thereby making renewed start-up of the fuel cell system difficult or impossible. Accordingly, there exists a need for a PEM fuel cell system design and mode of operation that accounts for the presence of water, water-based mixtures or other freezable reaction products in the fuel cell system.

SUMMARY OF THE INVENTION

According to a first aspect of the invention, a method for the operation of a fuel cell system is disclosed. The method includes configuring at least one fuel cell within the system to include an anode, a cathode and a membrane disposed between the anode and the cathode. Additional steps include defining an operational sequence of the system to include a period of system activity wherein fuel (such as gaseous hydrogen) is reacted with oxygen (such as atmospheric oxygen) to produce electricity and at least one reaction product, arranging an infeed device to be in direct fluid communication with at least one of the anode and the cathode, and activating the infeed device upon generation of at least one temperature-based control signal. The infeed device is configured to selectively introduce a chemical compound into one or more parts of the system. The mixture of the chemical compound and the reaction product lowers the reaction product's freezing temperature, making the reaction product (which can be, for example, water) less susceptible to freezing in cold weather during periods when the system is unable to generate enough heat, such as when the system is switched off. It will be appreciated by those skilled in the art that the fuel cell system can be made up from a plurality of individual fuel cells configured as a fuel cell stack. In the present context, the term "direct" in relation to fluid communication includes all instances of a defined, fluid-carrying flowpath (such as conduit), but does not include non-flowpath based modes, such as diffusion. Through this way of introducing the chemical compound, complications such as cooling systems with porous walls are avoided. In this way, the cooling system can be kept completely separate from the anode and the cathode of the fuel cell stack, thus reducing exposure of the anodes, cathodes and attendant catalysts to reaction-inhibiting chemicals. It will also be appreciated by those skilled in the art that the invention is valid generally for all fuel cell systems in which a gaseous fuel is used and water, a water-based mixture, or any other similarly freezable product arises as a reaction product.

The system is configured to analyze various environmental conditions as part of its determination as to whether to add the chemical compound to the fuel cell. If, for example, the outside temperature is already in the vicinity of the freezing point and the sensed fuel cell temperature is high, the system can interpret that the fuel cell will cool down as a result of the outside temperature when switched off for a long time, so that an infeed or injection of the chemical compound might be appropriate. If the fuel cell stack temperature and the outside temperature lie beneath the freezing point or in the vicinity of the freezing point, which can for example be the case after a short period of operation of the fuel cell (such as a short journey in an automobile) in a cold environment, then the system can expect that the fuel cell temperature will drop further. Here the injection of the chemical compound is also appropriate. Should however the fuel cell temperature be low in conjunction with a relatively warm outside temperature, this can be an indication that the fuel cell was started cold but can be expected to warm up as a result of higher outside temperatures, so that a freezing of the water is not to be expected. The system is additionally prepared to handle anomalous situations, such as when the outside temperature is relatively high towards midday in the winter, but likely to drop below the freezing point again in the evening. Moreover, in applications where the fuel cell is mobile, such as automotive applications, the area of use of a vehicle could also be automatically detected by a global positioning system (GPS) so that the feeding in of the chemical compound could be automatically adapted to the area of use and the time of the year.

Optionally, the method can include sensing at least one temperature indicative of the temperature of the fuel cell. This temperature can be an ambient temperature, a temperature inside the fuel cell or a thermal trend derived from historical data of either or both the ambient temperature and the temperature inside the fuel cell taken over a repeated time interval. The temperature-based control signal taken from one or more of these sensed temperatures can be generated as a first control signal when the sensed value is below that of a predetermined threshold temperature (such as a temperature at or near the freezing point of water, for example). A data storage device (such as a computer memory) can record the temperatures sensed over the repeated time interval such that the sensed information can form the historical value database. The system is also configured to analyze the historical value database to determine whether the thermal trend indicates the attainment of a temperature below that of the predetermined threshold temperature. A second control signal may be generated such that the first and second control signals together activate the infeed device. The second control signal can be from a variety of sources, but often is in response to switching off the system (such as through an automotive ignition switch in the case of automotive applications), in response to a user-defined override (such as a manual input activated irrespective of ambient or fuel cell temperatures), or in response to a predetermined time of day (such as an on-board clock signally connected to the control system). While the infeed device can be operated at any part of the system operational cycle (including during periods when the system is shut down), it is often operated during a shutdown sequence, where the system goes from a period of operability to one of inactivity.

The chemical compound may be introduced in one or both of an anode flowpath or a cathode flowpath, where the anode flowpath fluidly couples the anode and a fuel supply, while the cathode flowpath fluidly couples the cathode and an oxygen supply. Thus, the chemical compound can be introduced into the system with the fuel or oxygen. The infeed device can introduce an amount of the chemical compound proportional to the temperature difference between the sensed temperature and the predetermined threshold temperature. This amount can be between approximately one third of an ounce and approximately 350 ounces. This allows the amount of chemical compound being used to be tailored to the need, thus making it possible to use the chemical compound sparingly, and therefore extending the useful life of the supply. In addition, when the chemical compound is introduced by the infeed system during a shutdown sequence, it may displace the substantial entirety of fuel, oxygen or both that was present in the fuel cell during the period of activity just prior to the shutdown sequence. The chemical compound waiting to be used may be stored in a supply tank, and the supply tank is sized to hold up to approximately ten quarts of the chemical compound when the chemical compound is in liquid form, although specific applications may use a tank sized to hold up to approximately one quart. The chemical compound is configured to be introduced to the fuel cell in either a liquid or vapor phase; in situations where it would be particularly advantageous to ensure the chemical compound is introduced in vapor form, the infeed device may include heating device in order to vaporize the chemical compound and thereby facilitate the distribution into the corresponding spaces of the fuel cell system without having to simultaneously rely on an air compressor, auxiliary compressor or an infeed device. By this process, a chemical compound vapor pressure is sufficient to penetrate the substantial entirety of the anode, cathode and their respective flowpaths. In addition, the chemical compound can be pressurized prior to its introduction into the fuel cell by a compressor that can be placed in fluid communication with the anode flowpath or cathode flowpath. An auxiliary compressor can be added to supply the oxygen to the fuel cell system simultaneously with the introduction of the chemical compound, thus allowing the auxiliary air flow and the chemical compound to be mixed prior to exposure of the air to the cathode. An inert gas can be introduced into the fuel cell system simultaneously with the chemical compound, and can be used to purge the system of excess fuel (which may be in the form of inflammable hydrogen gas).

The chemical compound introduced into the fuel cell system in a well distributed manner according to the present invention is advantageous in that the chemical compound enters into remote corners and related hollow spaces of the fuel cell components (such as the porous parts of the anode and cathode) so that water which is present in such hollow spaces mixes with the chemical compound to reduce the likelihood of freezing at the expected freezing temperatures of water. In this manner, the spaces remain free of ice so that the fuel cell system can be started up again at any time without having to go through an additional thawing step. Furthermore, the water which remains ensures that the fuel cell membranes remain moist, which is important to proper fuel cell operability.

The chemical compound is configured to be in a liquid state at the normal freezing temperature of the reaction product (which, in the case of water, is approximately 32° F.), but in a gaseous state at temperatures corresponding to the fuel cell system when the system is at its normal operating condition. The chemical compound is preferably miscible with water, and has a boiling point in the range between approximately 68° F. and approximately 176° F., with a freezing point below approximately −40° F. Compounds especially adapted for use in the present fuel cell system include alcohols (such as methanol), bases, acids, sugars with at least one functional group and one to twenty carbon atoms, and compounds including hydrogen and at least one of carbon and nitrogen. The chemical compound should also be able to be catalytically broken down in the fuel cell. The products generated during the step of catalytically breaking down the chemical compound can be burned in a combustor, then vented to the atmosphere.

According to another aspect of the present invention, a method of operating a fuel cell system is disclosed. In addition to configuring the system to react fuel and oxygen to produce electricity and at least one reaction product, the steps include configuring an anode flowpath to route the fuel to the fuel cell's anode and a cathode flowpath to route the oxygen to the fuel cell's cathode, configuring at least one coolant flowpath to be fluidly decoupled from the anode flowpath and the cathode flowpath, arranging an infeed device to be in fluid communication with at least one of the anode flowpath and the cathode flowpath, configuring the infeed device to selectively introduce a chemical compound that upon mixing with the reaction product lowers the reaction product's freezing temperature, and activating the infeed device upon generation of at least one temperature-based control signal.

Optionally, the method can include sensing a temperature that, when below that of a predetermined threshold temperature, allows a first control signal to be generated. As before, the sensed temperature can be a plurality of temperatures, including an ambient temperature and a temperature inside the fuel cell. A data storage device can be configured to record over a repeated time interval at least one of the ambient temperature and the fuel cell temperature such that the temperature readings sensed over the repeated time interval define a historical value database. The system is further configured such that temperatures corresponding to the historical value database can be analyzed for thermal trends to determine what temperature regime the fuel cell system will likely be exposed to, and whether the introduction of the chemical compound to avoid fuel cell freezing is warranted.

According to still another aspect of the present invention, a method of operating a fuel cell system is disclosed. The method includes configuring a fuel cell stack to include a plurality of fuel cells each made up of an anode, cathode and membrane disposed between the anode and cathode, configuring an anode flowpath to establish fluid coupling between the anodes in the fuel cell stack and a fuel supply, configuring a cathode flowpath to establish fluid coupling between the cathodes in the fuel cell stack and an oxygen supply, defining an operational sequence of the system to include a period of system activity wherein fuel is reacted with oxygen to produce electricity and at least one reaction product, configuring at least one coolant flowpath to be fluidly decoupled from the anode flowpath and the cathode flowpath, arranging an infeed device to be in fluid communication with at least one of the anode flowpath or the cathode flowpath such that it can selectively introduce a chemical compound that upon mixing with the reaction product lowers the freezing temperature of the reaction product, sensing an ambient temperature that is indicative of the temperature environment adjacent to and outside the fuel cell stack, sensing a fuel cell temperature that is indicative of the temperature inside the fuel cell stack, configuring a data storage device to record at least one of the ambient temperature and the temperature inside the fuel cell over a repeated time interval such that information recorded during the repeated time interval defines a respective ambient temperature historical value database or fuel cell historical value database, analyzing at least one of the ambient temperature and fuel cell historical value databases to determine thermal trends therein, generating a first control signal when at least one of the sensed ambient temperature, fuel cell temperature, ambient temperature historical value database or fuel cell historical value database is below that of a predetermined threshold temperature, and generating a second control signal that together with the first control signal activates the infeed device.

According to still another aspect of the invention, a fuel cell system is disclosed. The system includes at least one fuel cell configured to react fuel with oxygen to produce electricity and at least one reaction product, an infeed device in direct fluid communication with at least one of the anode and the cathode to introduce a chemical compound, and a control system configured to activate the infeed device upon generation of at least one temperature-based control signal. When the chemical compound mixes with the reaction product, it lowers the reaction product's freezing temperature. As previously discussed, an anode flowpath is configured to route the fuel through at least a portion of the fuel cell to the anode so that a catalytic reaction with the fuel is configured to take place. Similarly, a cathode flowpath can be used to route the oxygen through at least a portion of the fuel cell to the cathode so that a catalytic reaction with the oxygen is configured to take place. Moreover, a membrane is disposed between the anode and the cathode such that electrolyte communication is established therebetween during operation of the system.

Optionally, the fuel cell system includes one or more temperature sensors configured to send the temperature-based control signal to the control system. As with the previous aspects, the plurality of temperature sensors can include an ambient temperature sensor and a fuel cell temperature sensor. Also as previously discussed, the fuel cell system can be equipped with a data storage device which stores historical values of the sensed temperatures, such as the temperature inside the fuel cell and the ambient temperature. The control system may further include an analysis system signally coupled to the data storage device such that the analysis system can analyze trends with respect to the stored historical values to determine the likelihood that a present temperature condition will require the control system to instruct the infeed system to introduce the chemical compound into the fuel cell. The control system may, even during periods of operational inactivity of the fuel cell system, produce a signal when a present temperature sensed by one or both of the ambient temperature sensor and the fuel cell temperature sensor is below that of a predetermined threshold. The signal permits a conclusion to be drawn that conditions in the fuel cell will drop below a predetermined temperature threshold (such as the freezing point of the reaction product), thus permitting the control system to generate a temperature-based control signal as the first control signal. In one configuration, a switch can be configured to turn the fuel cell system on and off, where a master signal generator signally connected between the control system and the switch generates a master signal upon switching off the fuel cell system. A pump may also be inserted in the anode flowpath to supply fuel (such as the previously mentioned gaseous hydrogen) such to increase fuel supply pressure. Any excess fuel can be returned to the anode flowpath inlet so that fuel is not wasted. The chemical compound can advantageously also be fed into the line at the outlet side of the corresponding pump.

As previously stated, the system can be configured such that when the infeed device is activated, the chemical compound can be made to displace the substantial entirety of the fuel, oxygen or both that were present in the fuel cell just prior to the activation of the infeed device. A chemical compound supply tank, air compressor, auxiliary air compressor and inert gas supply, all as previously described, can also be included. By way of example, for a fuel cell system in an automobile application, where the power output of the fuel cell system is approximately 135 horsepower, the fuel cell stack will contain approximately three ounces of water when being switched off following normal operation. In order to keep this quantity of water liquid at temperatures of $-40°$ F., approximately one to one and a half ounces of methanol are required to be added each time the system is operated. Assuming that the fuel cell system will be started 100 times in winter, then a total of approximately one gallon of methanol is required for each freeze-prone season, and a methanol supply tank of corresponding size would be required to be on board.

According to yet another aspect of the invention, a fuel cell system is disclosed. The fuel cell system includes at least one fuel cell configured to react fuel with oxygen to produce electricity and at least one reaction product, an infeed device and a control system configured to activate the infeed device upon generation of at least one temperature-based control signal. The fuel cell includes an anode flowpath configured to route fuel through at least a portion of the fuel cell, an anode in fluid communication with the anode flowpath and upon which a catalytic reaction with the fuel is configured to take place, a cathode flowpath configured to route oxygen through at least a portion of the fuel cell, a cathode in fluid communication with the cathode flowpath and upon which a catalytic reaction with the oxygen is configured to take place, a membrane disposed between the anode and the cathode such that electrolyte communication is established therebetween during operation of the system, and at least one coolant flowpath fluidly decoupled from the anode flowpath and the cathode flowpath. The infeed device can selectively introduce to at least one of the anode flowpath and the cathode flowpath a chemical compound that upon mixing with the at least one reaction product lowers the freezing temperature of the reaction product.

Optionally, the fuel cell system includes at least one temperature sensor configured to detect a temperature indicative of the temperature of the fuel cell, and a comparitor configured to generate the temperature-based control signal as a first control signal when a temperature reading from the temperature sensor is below that of a predetermined threshold temperature. As before, a data storage device to record the temperature indicative of the temperature of the fuel cell over a repeated time interval can be included, where the information recorded over the repeated time interval defines a historical value database. Also, an analysis system is signally coupled to the data storage device and is configured to analyze trends with respect to the historical value database and to generate the temperature-based control signal as a first control signal when either the trend analysis indicates the historical value database or the temperature reading from the temperature sensor is below that of a predetermined threshold temperature. A master signal generator is configured to send a second control signal upon attainment of predetermined condition. An infeed control is responsive to the first and second control signals such that upon receipt of the first and second control signals, the control system can activate the infeed device. As previously discussed, the temperature sensor comprises an ambient temperature sensor and a fuel cell temperature sensor. In addition, the predetermined condition to generate the second control signal may be at least one of a switch off signal (such as an ignition switch in the case automotive applications), a user override signal or a time of day signal.

According to still another aspect of the invention, a fuel cell system includes a fuel cell stack comprising a plurality of fuel cells, an infeed device and a control system. The control system is made up of an ambient temperature sensor configured to send an ambient temperature signal, a fuel cell stack temperature sensor configured to send a fuel cell stack temperature signal, a data storage device which stores historical values of the fuel cell stack temperature signal and the ambient temperature signal, an analysis system signally coupled to the data storage device, at least one comparator a master signal generator configured to send a second control signal upon attainment of predetermined condition; and an infeed control responsive to the first and second control signals such that upon receipt of the first and second control signals, the control system is adapted to activate the infeed device. Each fuel cell in the stack includes an anode flowpath configured to route the fuel through at least a portion of the fuel cell, an anode in fluid communication with the anode flowpath and upon which a catalytic reaction with the fuel is configured to take place, a cathode flowpath configured to route the oxygen through at least a portion of the fuel cell, a cathode in fluid communication with the cathode flowpath and upon which a catalytic reaction with the oxygen is configured to take place, a membrane disposed between the anode and the cathode such that electrolyte communication is established therebetween during operation of the system, and at least one coolant flowpath fluidly decoupled from the anode flowpath and the cathode flowpath. The analysis system is configured to analyze trends with respect to the stored historical values and to generate a trend analysis signal based on a comparison of the historical values to present values of at least one of the ambient temperature and the fuel cell stack temperature. The comparitor is signally coupled to the ambient temperature sensor and the fuel cell stack temperature sensor, and is configured to generate a first control signal when at least one of the ambient temperature signals, the fuel cell stack temperature signals or the trend analysis signals are below that of a predetermined threshold temperature.

DESCRIPTION OF THE PREFERRED EMBODIMENT

Figure 1:
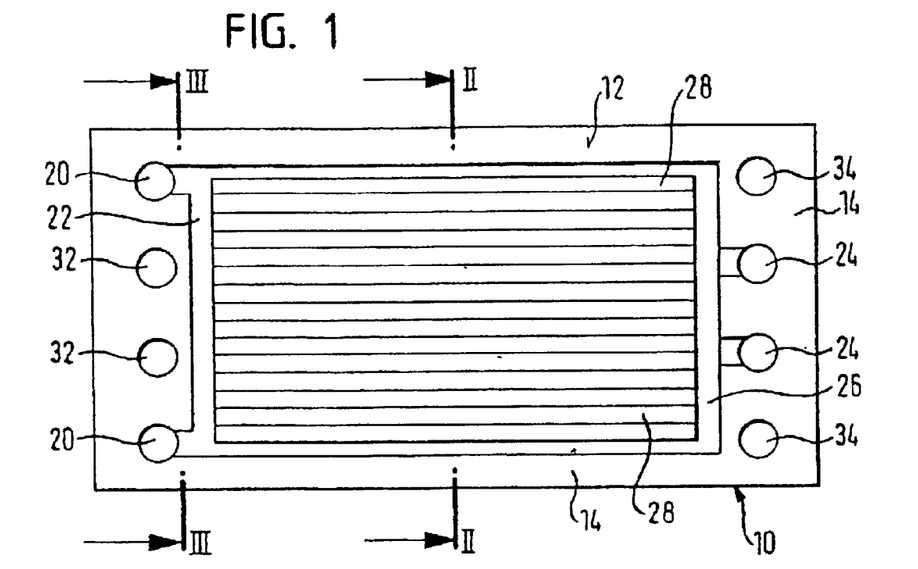
FIG. 1 shows a schematic plan view of a bipolar plate of a fuel cell.
Figure 3:
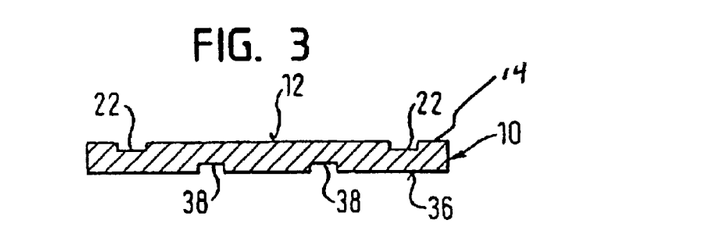
FIG. 3 shows a cross-section through a segment of the bipolar plate of FIG. 1 along plane III—III.

Referring first to FIGS. 1 and 3, features of a fuel cell are shown. Referring with particularity to FIG. 1, a bipolar plate 10 which is suitable for use in a fuel cell arrangement is shown. An upper surface 12 of the bipolar plate 10 is provided with a generally planar peripherally extending margin 14. Supply openings 20 for incoming oxygen (typically in the form of atmospheric air) are provided on one end of the bipolar plate 10 and are fluidly connected to a recessed channel 22 in the plate upper surface 12. Likewise, discharge openings 24 on the other end of the bipolar plate 10 are fluidly connected to a recessed channel 26. The shaping of the recessed channels 22, 26 in the bipolar plate 10 can be produced by conventional methods, such as through an etching process. The recessed channels 22, 26 are fluidly coupled to one another such that air introduced in supply openings 20 flows through recess channels 22, 26 to discharge openings 24 prior to being removed from the fuel cell. Passages 28 extend in the longitudinal direction of the bipolar plate 10 between the recess channels 22, 26 to establish the necessary fluid coupling therebetween. Together, supply openings 20, recessed channels 22 and 26, passages 28 and discharge openings 24 define the portion of a cathode flowpath that is in the fuel cell. A lower surface 36 of the bipolar plate 10 is situated opposite of upper surface 12. Openings 32 and 34 in the bipolar plate 10 represent supply and discharge openings, respectively, for the fuel, and are configured in a similar way to that of the air supply and air discharge openings 20 and 24 disposed in the cathode flowpath on upper surface 12. Recess channel 38 is disposed in the lower surface 36 of plate 10 and is used to fluidly connect the supply and discharge openings 32 and 34. Similar to that of the upper surface 12 of the plate 10, passages 40 extend in the longitudinal direction of the bipolar plate 10 between the recess channel 38 in the lower surface 36 of plate 10 to establish the necessary fluid coupling between openings 32 and 34. Together, supply openings 32, recess channel 38, passages 40 and discharge openings 34 define the portion of an anode flowpath in a manner analogous to that of the cathode flowpath. As will be discussed in more detail below, conduit that provides fluid coupling between the anode and cathode in the fuel cells and other parts of the fuel cell system makes up additional portions of the anode and cathode flowpaths. Since portions of the anode flowpath are on opposite sides of the bipolar plate 10 from the cathode flowpath (particularly the aforementioned recesses and passages), channel 38 and passages 40 are fluidly isolated such that (save the reaction between ionized oxygen and fuel across the membrane of FIG. 4) the air moving through the features in the upper surface 12 does not mix with the fuel moving through the features on the plate 10 lower surface 36.

Figure 2:
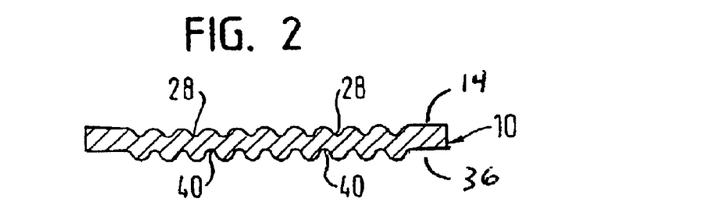
FIG. 2 shows a cross-section of an individual bipolar plate layer.
Figure 4:
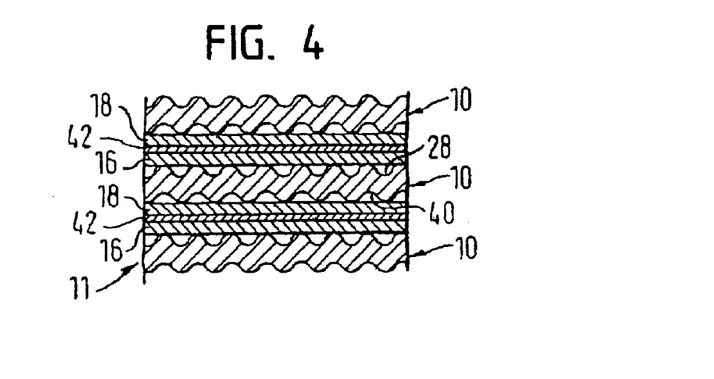
FIG. 4 shows a schematic cross-section of a multilayer fuel stack.

Referring next to FIGS. 2 and 4, an individual bipolar plate 10 and a multilayer fuel cell stack 11 are shown. The bipolar plates 10 can be stacked against adjacent fuel cells with membranes 42 disposed between them. In this way, protons leaving electrode 18 at the anode side 41 of the fuel cell pass through membrane 42 and react in the adjacent reaction chamber at the cathode side 43 with oxygen that is produced at electrode 16, such that power (in the form of electrical current) is produced with water as a byproduct. Cooling passages (not shown) can be incorporated into the bipolar plates and can accommodate either air or liquid cooling to keep the temperature in the fuel cell below levels that could damage membrane 42. These cooling passages have no connection to the flow passages 28 or 40, and as such, the cooling system is thus fluidly separated from the anode side 41 and the cathode side 43 of the fuel cell membrane 42. Thus, for example, there is no diffusion of coolant from the cooling passages to either the anode or cathode flowpaths. Such cooling passages can for example be formed in that each bipolar plate 10 is formed with two parts which lie already against one another, with the cooling passages being machined into the adjacent faces of the two plate parts and communicating with respective supply and discharge passages at the two ends of the bipolar plates 10. Electrodes 16 and 18 are placed along the planar surface defined by peripherally extending margin 14 such that a sealed connection is formed between adjacent plates of a fuel cell stack 11 made up of a plurality of stacked PEM fuel cells. Electrode 18 is configured as the anode to react with incoming fuel (for example, hydrogen) such that when the fuel is catalysed, electrode 18 conducts electrical current caused by the liberation of electrons from the fuel, while the protons (i.e., the ionized hydrogen) are able to pass through a membrane via diffusion. Similarly, electrode 16 is configured as the cathode to react with incoming oxygen (typically in the form of air) such that when the oxygen is catalysed, it reacts with the protons that diffuse across the membrane to form water.

Figure 5A:
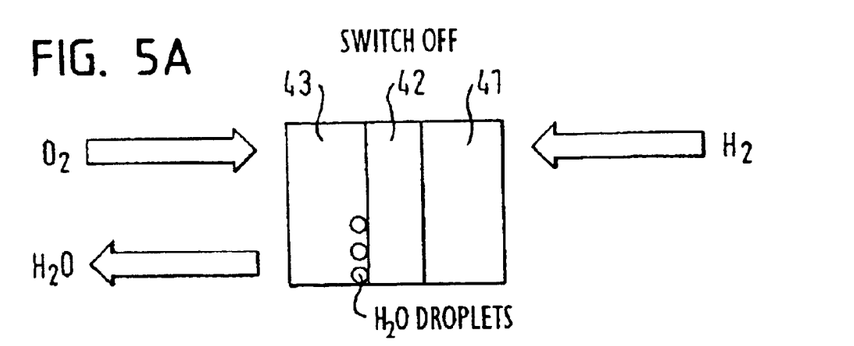
FIGS. 5A and 5B show a schematic representation of the problem of operating a fuel cell system at sub-freezing temperatures.
Figure 5B:
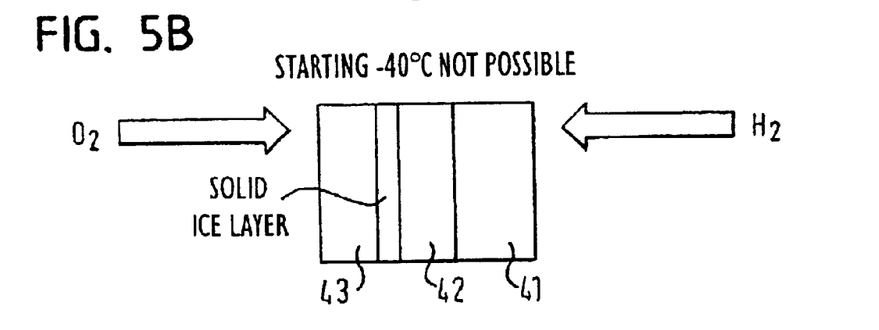

Referring next to FIGS. 5A and 5B, the problem of ice formation in the conventional fuel cell discussed above is shown in a schematic form. As schematically illustrated by the arrows, fuel in the form of hydrogen $H_2$ is supplied to the anode side 41 of the fuel cell whereas atmospheric oxygen $O_2$ is supplied to the cathode side 43. Water $H_2O$ is continuously produced at the cathode side 43 during the operation of the fuel cell as the product of the reaction between the ionized hydrogen and oxygen, and is normally discharged in vapour form from the cathode side 43 of the fuel cell. A part of the water $H_2O$ produced diffuses through the membrane 42 and increases the humidity level at the anode side 41, which is entirely desirable because the membranes 42 must be kept moist for normal operation. When the fuel cell is switched off, the temperature inside the cell drops and the water $H_2O$ which was initially present in the vapour form precipitates in droplet form wherever it is present, including flow passages 28, 40 (not presently shown) or electrode interstices (not shown). When the temperature drops below the freezing temperature of the water $H_2O$, the droplets can coalesce. Depending on the amount of blockage caused by the frozen water $H_2O$ droplets, starting up of the fuel cell is rendered more difficult or impossible, as the ice layer prevents hydrogen $H_2$ from the anode side 41 coming into contact with atmospheric oxygen $O_2$ from the cathode side 43. Under such a temperature regime, a supplemental means for heating up the fuel cell would be required so that the ice can melt and the system can be made operational again.

Figure 5C:
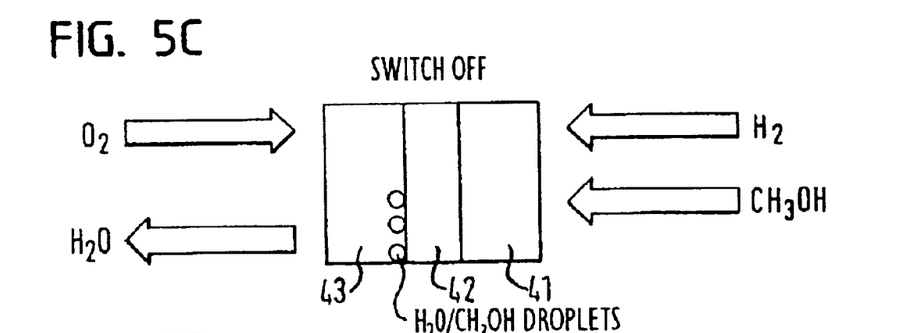
FIGS. 5C and 5D show the basic principles in accordance with the present invention to avoid the freezing problems shown in FIGS. 5A and 5B.
Figure 5D:
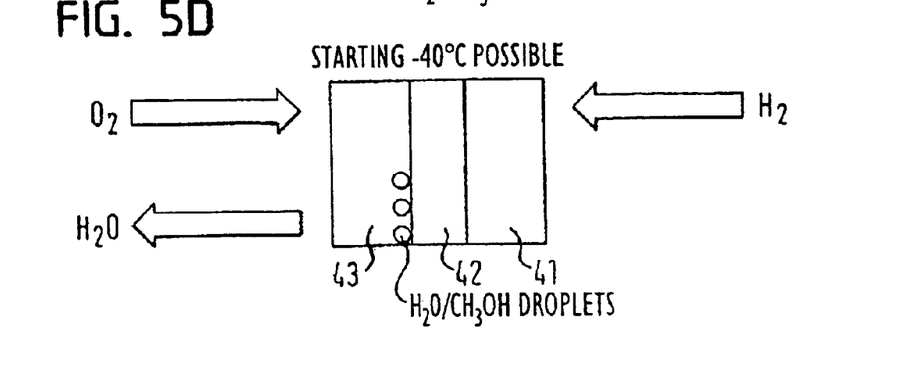

Referring next to FIGS. 5C and 5D, the principle of how the present invention operates to prevent freezing inside a fuel cell is shown in schematic form. A chemical compound selected in accordance with the invention may possess the following characteristics: it is miscible with water; it has a low boiling point, for example in the range between 68° F. (20° C.) and 176° F. (80° C.); it has a low melting point, for example below −40° F. (−40° C.) or even below −58° F. (−50° C.); it can easily be broken down catalytically in the fuel cell; its catalytic breakdown produces breakdown products that do not appreciably impair the catalytic reaction of the fuel and oxygen supplies in the fuel cell; the breakdown products do not appreciably inhibit the proton transport in the membrane; and the breakdown products serve as fuel. Such chemical compounds can be alcohols (in particular methanol or ethanol), bases, acids and sugars, the last of which have a functional group or a plurality of functional groups and 1 to 20 carbon atoms. In addition, derivatives of the above compounds and related compounds which contain carbon and/or nitrogen and hydrogen are viable alternatives.

The chemical compound, in the form of methanol $CH_3OH$, is supplied to the anode side 41 of the fuel cell with the hydrogen $H_2$. While the chemical compound can be added during any time during operation of the system (as well as when the system is not operating), the following discussion is given, by way of example, during the transitory shutdown period of the fuel cell. The methanol $CH_3OH$ diffuses through the membrane 42 and mixes with the water $H_2O$ which has collected at the cathode and anode sides, 43 and 41 respectively to form mixture $H_2O/CH_3OH$ droplets (shown for simplicity only on the cathode 43). By using 1.1 ounce (32 g) of methanol $CH_3OH$ for each 2.8 ounces (80 g) of water $H_2O$, the ensuing mixture $H_2O/CH_3OH$ droplets do not freeze, even at very low temperatures (such as −40° F. (−40° C.)), but rather remain in liquid form. During subsequent system start-up, as shown with particularity in FIG. 5D, the flow of hydrogen $H_2$ supplied to the anode side 41 and oxygen $O_2$ to the cathode side 43 of the fuel cell proceeds uninterrupted such that the catalysed ions can react to generate power. While methanol $CH_3OH$ slightly impairs the full efficiency of the fuel cell during start-up, it is quickly broken down by the fuel cell during system operation and extracted from the fuel cell with the exhaust gas streams in the form of $CO_2$ and $H_2O$. Furthermore, by having the methanol $CH_3OH$ introduced in discrete quantities and over only a portion of the system operating envelope, the deleterious effects on system operability due to the continued presence of methanol $CH_3OH$ at the electrodes is avoided. Moreover, the mixture $H_2O/CH_3OH$ droplets ensure that the membranes 42 always remain moist so that they are not unnecessarily damaged and that power generation always takes place. Once the system passes from its start-up mode of operation to steady-state operation, the heat generated in the fuel cells is sufficient to raise the temperature in the fuel cell such that there is no longer any danger that the water produced will freeze.

Figure 6:
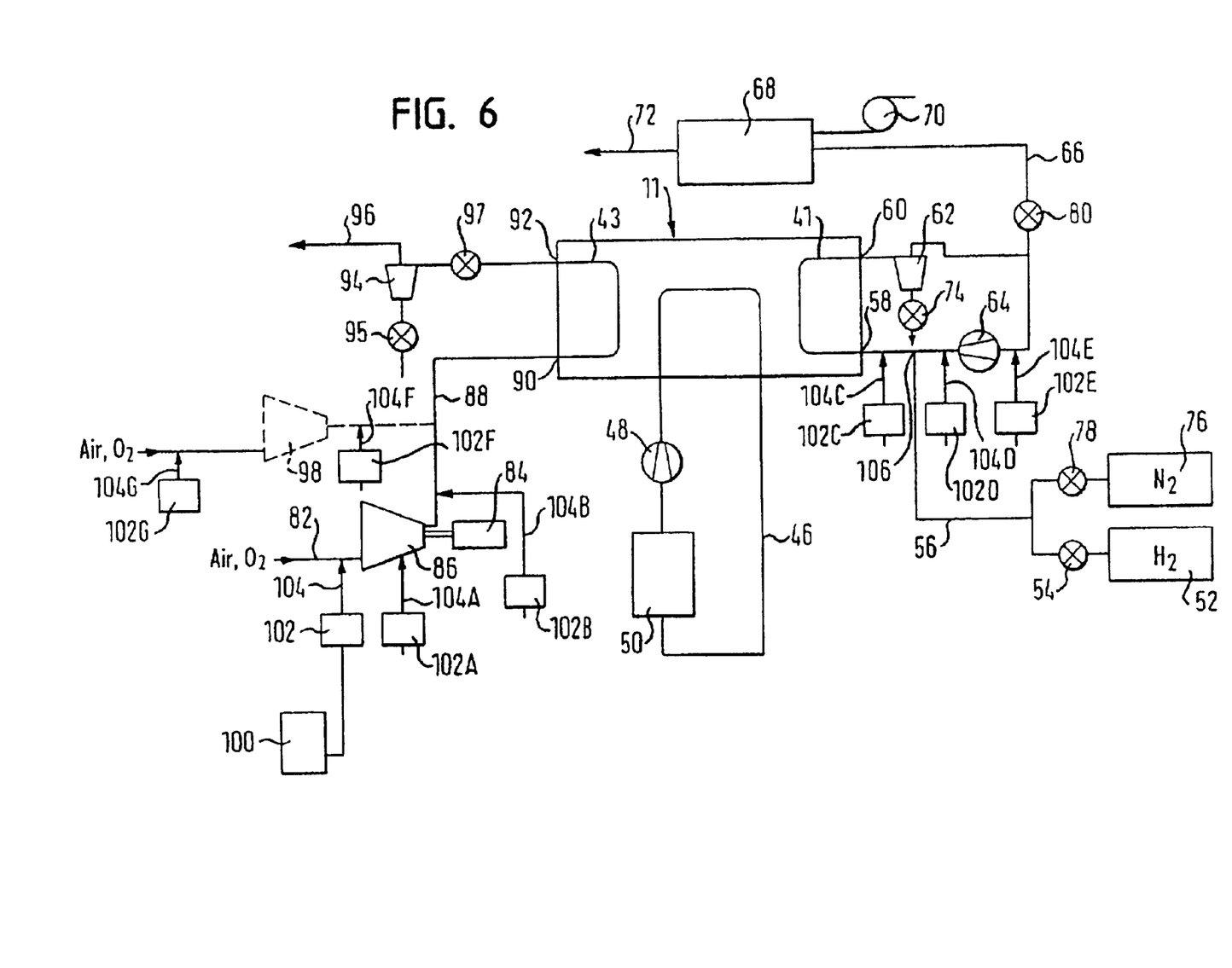
FIG. 6 shows a schematic representation of a fuel cell system according to the present invention equipped with a device for introducing an anti-freezing chemical compound into the fuel cell, as well as several possible locations for the introduction of the compound.

Referring next to FIG. 6, a schematic representation of a fuel cell system with the freeze-avoiding features of the present invention is shown. Fuel cell stack 11 includes a plurality of individual fuel cells which can be connected electrically in series, parallel or a combination of both. At the anode side 41 of the fuel cell stack 11, hydrogen $H_2$ is fed from a supply 52 via valve 54 and line 56 into the anode via anode flowpath in the fuel cell. The hydrogen $H_2$ thus enters the fuel cell stack 11 at the inlet 58, while the anode exhaust gases which contain non-consumed hydrogen and water emerge from the fuel cell stack 11 at the outlet 60. The water which condenses out is received in a collecting container 62, while a part of the emerging hydrogen is returned to the inlet 58 by means of a pump 64. The remainder of the anode side exhaust gases are fed via valve 80 and line 66 to a combustor device 68, where together with air from a fan 70, the anode side exhaust gases are burned such that the combustion exhaust gases, principally nitrogen and water vapor, leave the fuel cell stack 11 via line 72. The water in the container 62 can be drained from time to time by means of a drain valve 74. At the anode side of the fuel cell stack there is also a supply of nitrogen $N_2$ in the reservoir 76. When the fuel cell stack 11 is switched off, valve 54 closes and valve 78 is opened in order to introduce nitrogen $N_2$ via line 56 into the anode flowpath in the fuel cell in order to displace the hydrogen $H_2$ from the fuel cell. The hydrogen $H_2$ can then be burned under controlled conditions in the combustor 68, thereby reducing and the danger of hydrogen $H_2$ accumulation in the fuel cell. The combustion device 68 does not have to be continuously in operation and can be isolated from the anode circuit 41 by means of the valve 80. As discussed previously, supply openings 32, recess channel 38, passages 40 and discharge openings 34 define the portion of an anode flowpath that is in the fuel cell; the inclusion of valve 54, line 56, inlet 58, outlet 60, collecting container 62, pump 64, valve 80 and line 66 defines the entire anode flowpath for the fuel cell system.

Air enters the cathode side 43 of the fuel cell stack 11 via line 82, and can be compressed by a compressor 86 driven by a motor 84. After passing through compressor 86, the air passes through line 88 to the cathode inlet 90. The cathode exhaust gases, which principally consist of water vapor, nitrogen and oxygen, emerge from the cathode outlet 92 of the fuel cell stack 11, where water vapor can be collected in a container 94, while the remaining exhaust gases are vented to the atmosphere via line 96 and valve 97. Optional auxiliary compressor 98, which is likewise driven by a motor (not shown), or compressor 86 can be used to start up the fuel cell system. As with the anode side of the fuel cell system, a valve 95 can be used to selectively allow water collected in container 94 to be drained from the system. The switch-off control (such as an automotive ignition switch) or infeed control (neither of which are presently shown) can be used, if necessary, to timely close valves such as 54, 78, 80, 97 in order to lock the chemical compound inside the fuel cell stack 11. The infeed control or a switch-off control can moreover ensure, for example, that the valves 74 and 95 are opened in order to drain collected water from the fuel cell system to avoid freezing risks. As discussed previously, supply openings 20, recessed channels 22 and 26, passages 28 and discharge openings 24 define the portion of a cathode flowpath that is in the fuel cell; the inclusion of line 82, compressor 86, line 88, cathode inlet 90, cathode outlet 92, container 94, line 96 and valve 97 defines the entire cathode flowpath for the fuel cell system.

The chemical compound (discussed in conjunction with FIGS. 5C and 5D) is injected from a supply tank 100 by an infeed system 102 into the line 82 via line 104. The chemical compound may be introduced into the fuel cell system in liquid form, and while the fuel cell system is being switched off such that it is mixed with the air in compressor 86 to flow through the line 88 and into cathode side 43 of the fuel cell stack 11, where it becomes substantially homogenously distributed in all hollow spaces, including longitudinal channels (not presently shown) and electrode interstices (not shown). Thus, upon shutdown, the part of the chemical compound introduced into the fuel stack 11 can diffuse through the membranes (not presently shown) to the anode side 41 of the fuel cells. The chemical compound inhibits the formation of ice in the fuel cell stack 11 and in the relevant lines that would otherwise become blocked and hamper the renewed starting up of the fuel cells.

Although the chemical compound is shown in the figure as being introduced into fuel cell system at line 82, such location is not absolutely essential, as variations on the chemical compound infeed points can be considered, and are indicated in FIG. 6 as 102A–G and 104A–G. The first two of these show alternative locations where the chemical compound can be introduced into the cathode side of the fuel cell stack 11. Of these two, the first, corresponding to 102A, 104A, shows the chemical compound being fed into an intermediate location within the compressor 86 rather than at the compressor inlet. The second location, corresponding to 102B, 104B is introduced at the outlet of compressor 86. In this position, the infeed pressure is higher, and can thus penetrate more hollow spaces in the fuel cells. In the alternative, the chemical compound can be introduced into the anode side 41 of the fuel cell stack 11. When the introduction of the chemical compound takes place at the anode side 41, the chemical compound is at least substantially uniformly distributed in the hollow spaces at the anode side 41 and can diffuse through the membranes (not presently shown) and thus reach the cathode side 43. A possible position here would correspond to 102C, 104C such that the position is downstream of the supply point 106 for the fuel. The chemical compound could also take place upstream of the recirculation pump 64, as depicted by 102D, 104D or downstream of the recirculation pump 64 at 102E, 104E. In another alternative location, when optional auxiliary compressor 98 is present, the infeed can also take place at the position 102F, 104F downstream of the auxiliary compressor 98 or at the auxiliary compressor 98 inlet at 102G, 104G.

Liquid cooling circuit 46 is represented as a loop to ensure adequate cooling of the stack 11 during system operation. This cooling circuit is autonomous relative to the anode side 41 and the cathode side 43 such that fluid in the liquid cooling circuit 46 does not mix with the fluid generated by the reaction between the hydrogen $H_2$ and oxygen $O_2$ at the cathode. Liquid cooling circuit 46 further includes a closed cooling loop with a pump 48 and radiator 50.

Figure 7:
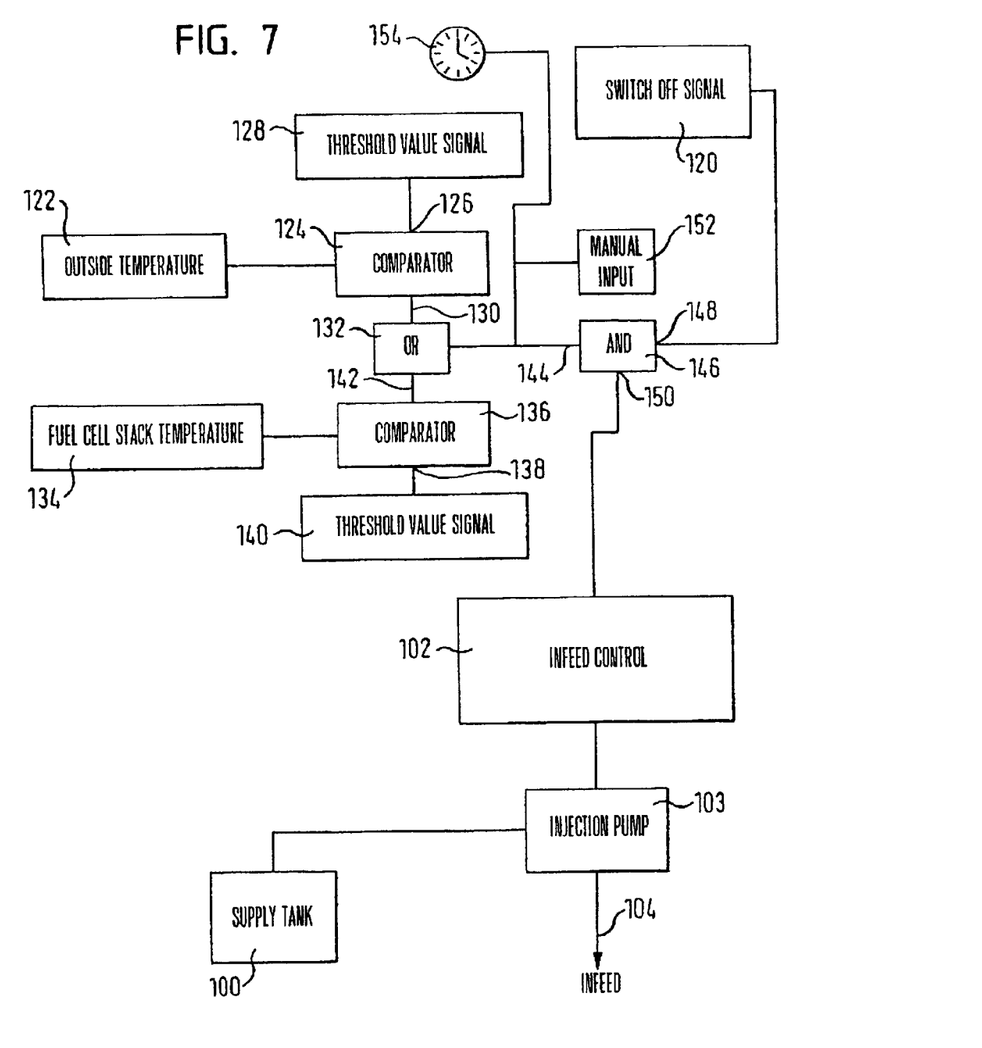
FIGS. 7 through 9 show schematic representations of various ways to control the introduction of the anti-freezing chemical compound.

Referring next to FIG. 7, a method for introducing the chemical compound into the fuel cell stack is shown. While the system depicted in the figures and described below is well-suited to vehicular and related transportation applications, it will be appreciated by those skilled in the art that the fuel cell system is not so limited. Upon user initiation of a switch-off command or signal 120, an outside temperature signal is sent (either continuously or at specified time intervals) by the outside temperature sensor 122 to a comparator 124, which compares the temperature sensed to a reference input 126 that corresponds to a predetermined threshold value 128. When the comparator 124 establishes that the temperature value coming from the outside temperature sensor 122 lies below the predetermined threshold value 128 (which could be set to, for example, a temperature just above the freezing point of water, such as 37° F. (3° C.)), it generates an output signal to a first input 130 in an OR-gate 132. Alternatively, a temperature value could also be applied from a fuel cell stack temperature sensor 134 to a comparator 136, which, in a manner similar to comparitor 124, compares the sensed temperature to a reference input 138 of predeterminable threshold value 140. Should the comparator 136 show that the fuel cell stack temperature lies below the predetermined threshold value 140, then a signal is generated and sent to a second input 142 of the OR-gate 132. When the OR-Gate 132 receives a signal, either at the first input 130 or the second input 142, the OR-gate 132 generates an output signal which is applied to the input 144 of an AND-gate 146. Upon receipt of the compared temperature input 144 and the input 148 from switch-off signal 120, the AND-gate 146 sends an output signal 150 to one of the infeed controls 102, 102A, 102B, 102C, 102D, 102E, 102F or 102G (depending on the introduction location, all as shown in FIG. 6). This in turn activates the injection pump 103 to take the chemical compound from supply tank 100 and injects it into the fuel cells via the respective line 104, 104A, 104B, 104C, 104D, 104E, 104F or 104G.

The signal being sent from fuel cell stack temperature sensor 134 normally lies above the threshold value 140, for example, during normal operation, the fuel cell stack temperature is about 176° F. (80° C.). Nevertheless, when the vehicle is started in a "cold" condition in a sub-freezing environment and has not travelled far, a situation can arise in which the fuel cell has not sufficient time to warm up, and the temperature still lies below or only slightly above the freezing point of water. In such situations, the danger of freezing is again present and the temperature signal for the fuel cell stack temperature sensor 134 can be exploited in order to energize the infeed control via the AND-gate 146. This would also be useful if the outside temperature sensor 122 fails.

Since it is possible in the winter to have the fuel cell system exposed to temperatures above the freezing temperature of water during the daytime but below in the night, additional steps can be taken to prevent ice formation. One possibility would be to provide for a manual input 152 whereby the user (driver) can manually apply a signal to the input 144 of the AND-gate 146 which can serve, likewise in combination with the switch-off signal 120, for the feeding of the chemical compound in the previously described way and manner. Another possibility is to provide a clock 154 or related timer that is programmed in accordance with local circumstances, for example during months where sub-freezing temperatures can be expected, and which feeds a signal to the inlet 144 of the AND-gate 132, which then necessarily ensures the infeed control 102 is activated in this time period when a switch-off signal 120 is simultaneously present.

Figure 8:
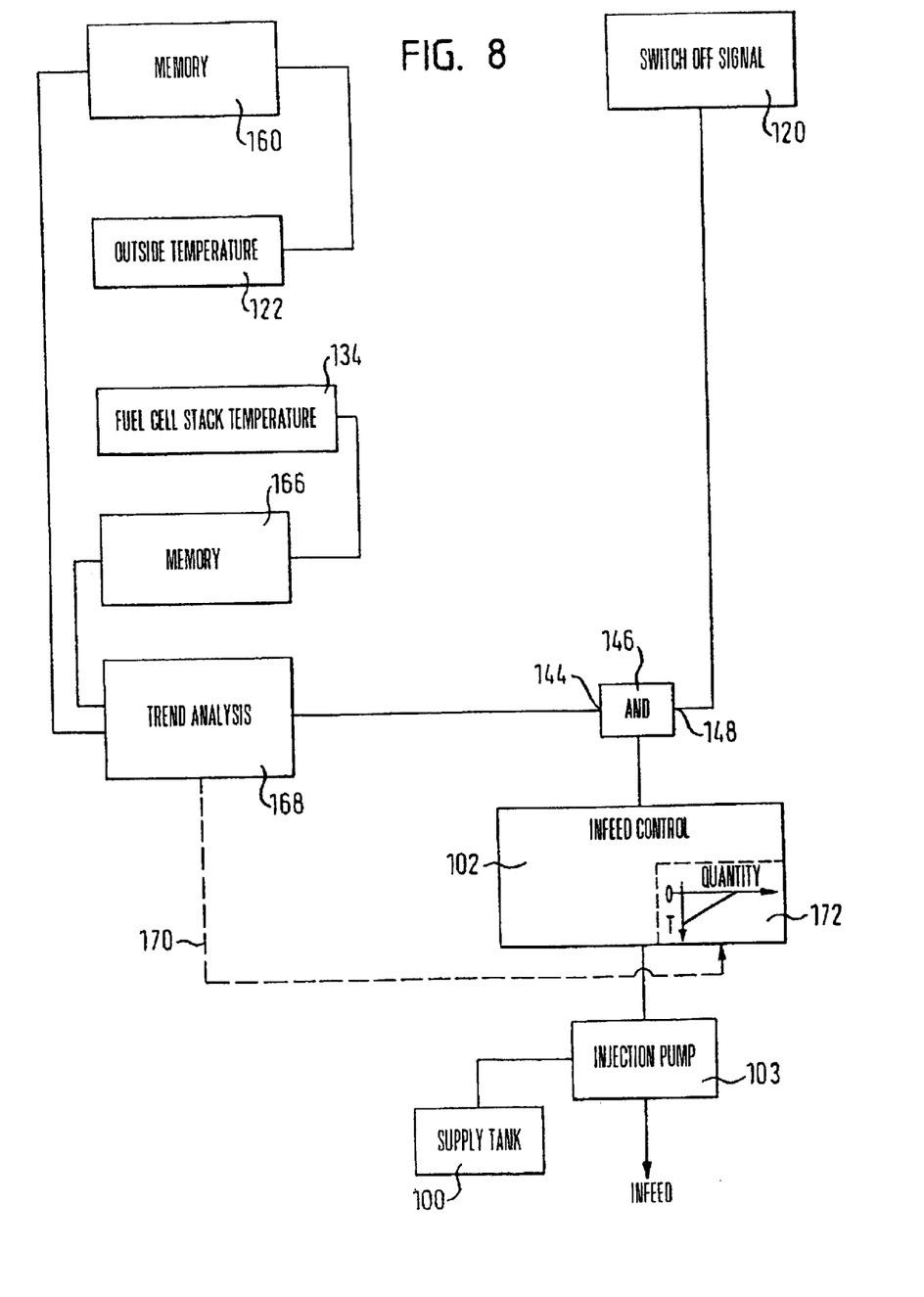

Referring next to FIG. 8, a schematic diagram of an alternative method of introducing a chemical compound to avoid fuel cell freezing is shown. The distinction of FIG. 8 with respect to FIG. 7 is that the outside temperature sensor 122 and the fuel cell stack temperature sensor 134 are coupled to respective memory devices 160 and 166 which sense and store these sensed temperature values at preset time intervals so that historic data concerning these temperatures is available. For example, the corresponding values could be stored over at least one day, or over longer periods of time. Analyzing system 168 interrogates the stored values in the memories 160 and 166 and can carry out a trend analysis to first determine whether temperatures below the freezing point of water are to be expected, and, if necessary to send a signal to the input 144 of the AND-gate 146. If both signal 144 and a switch-off command 120 are present at the inlet 148 of the AND-gate 146, the infeed control 102 becomes energized. By way of example, if it is found that in the previous night the outside temperature fell below 32° F. (0° C.), which can also be confirmed for example by the fuel cell stack temperature sensor 134, then the chance of freezing is also present the day after. The trend analysis determined by analyzing system 168 could then give a corresponding signal to the inlet 144. If temperature values are stored over a longer period of time, the likelihood of an accurate determination is enhanced. If, for example, the temperature falls below the freezing point of water every night for seven consecutive days, then it can be expected with a high degree of probability that sub-freezing temperatures will be encountered on the following day, and that activating the infeed control 102 is appropriate.

The trend analysis also makes it possible to determine whether temperatures of each passing day are continuously rising or falling as a result of the time of the year. For example, if the stored data indicates that the average night temperatures a week ago were at 14° F. (−10° C.) but in the night previously had already risen to 41° F. (5° C.), the system can be programmed to respond accordingly to selectively give an energizing signal. Should the trend analysis also show that the night temperatures are below the freezing point of water but are gradually becoming higher, then this could be exploited in order to control the quantity of the chemical compound injected depending on the temperatures expected. This additional possibility is shown by the broken line 170, with the inset 172 in the infeed control 102 showing how a simple control of the injected quantity of the chemical compounds can be effected via the line 170 depending on the temperature value. As discussed previously, while the infeed controls of FIGS. 7 and 8 are premised on switching off the fuel cell stack, they could also be activated upon the occurrence of other conditions, such as when the outside temperature (measured by outside temperature sensor 122) or the fuel cell stack temperature (measured by fuel cell stack temperature sensor 134) reaches threshold values at which the danger of water freezing exists.

Figure 9:
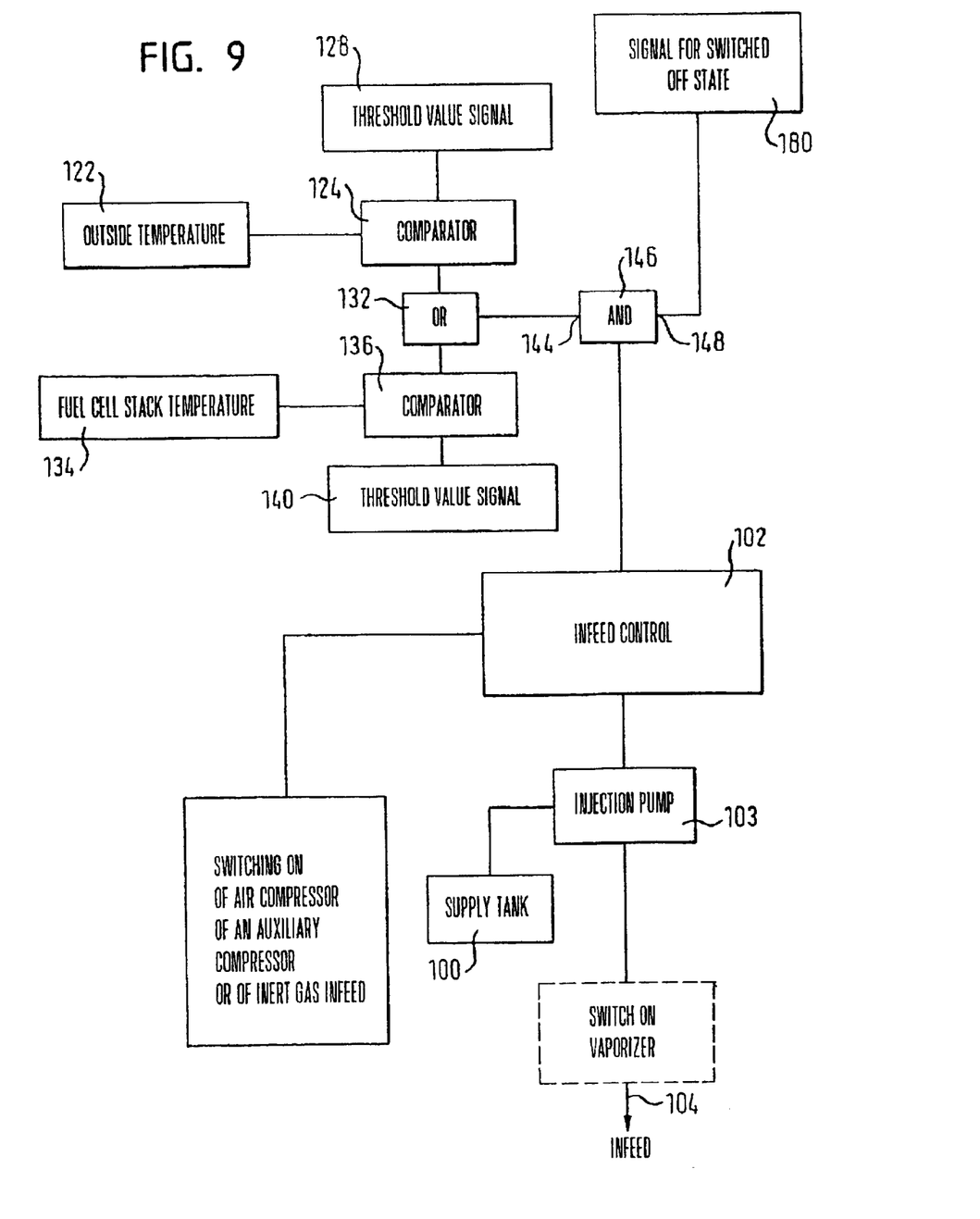

FIG. 9 now shows how an introduction of the chemical compound is possible after switching off the fuel cell stack. It is first of all assumed that a switch-off command is present and that a switched off state 180 in the fuel cell stack exists, which is transmitted to the input 148 to the AND-gate 146. As before, the outside temperature is determined by the outside temperature sensor 122. Also as discussed before, the fuel cell stack temperature, determined by the fuel cell stack temperature sensor 134, could be used in conjunction with or in place of outside temperature sensor 122 such that either could send a signal through their respective comparitors 124, 136, and taking account of the preset threshold value from the respective threshold values 128 and 140, apply a signal through OR-gate 132 to the input 144 of the AND-gate 146 when the temperatures falls below the respectively provided threshold value. In this circumstance, either the air compressor 86, auxiliary compressor 98 or valve 78 (all shown in FIG. 6) can be temporarily energized by the infeed control 102, 102A, 102B, 102C, 102D, 102E, 102F or 102G to supply air or an inert gas to one or both of the cathode side 43 or to the anode side 41 of the fuel cell stack 11, while simultaneously introducing the chemical compound via the injection pump 103 at the respectively provided position 104, 104A, 104B, 104C, 104D, 104E, 104F or 104G.

In situations where the infeed temperature is low enough that the chemical compound is only present in the liquid state, the chemical compound can be introduced in vapor form in a heating device in the form of a vaporizer 105 which can be activated by the infeed control 102. Alternately, the quantity to be injected is first vaporized, then forced into the fuel cell stack under the pressure concomitant with the vaporization, with simultaneous opening of the valves 80 or 97 (both shown in FIG. 6). In this way, the entering vapors force the already present gases to flow out; once the entering vapors are distributed in the hollow spaces, the valves 80 and 97 can be closed again. Irrespective of which specific method is used in order to feed the chemical compound into the fuel cell stack, the components depicted schematically in FIGS. 7 to 9 can either be realized by separate components in modular form or many of the functions can be present in the form of a corresponding programming of a computer or controller or microprocessor to execute the described functions.

Having described the invention in detail and by reference to some specific embodiments thereof, it will be apparent that modifications and variations are possible without departing from the scope of the invention which is defined in the appended claims.

What is claimed is:

1. A method of operating a fuel cell system, said method comprising:

configuring at least one fuel cell within said system to include an anode, a cathode and a membrane disposed between said anode and said cathode;

defining an operational sequence of said system to include a period of system activity wherein fuel is reacted with oxygen to produce electricity and at least one reaction product;

arranging an infeed device to selectively introduce a chemical compound that upon mixing with said at least one reaction product lowers the freezing temperature of said at least one reaction product;

configuring a data storage device to record at least one of a temperature inside said fuel cell and an ambient temperature over a repeated time interval such that said at least one of said ambient temperature and said temperature inside said fuel cell sensed over said repeated time interval defines a historical value database;

sensing at least one temperature indicative of the temperature of said at least one fuel cell;

analyzing said historical value database to determine whether said sensed temperature indicates the attainment of a fuel cell temperature below that of a predetermined threshold temperature;

generating a temperature-based control signal as a first control signal when said sensed temperature is below that of said predetermined threshold temperature; and activating said infeed device upon generation of said temperature-based control signal.

2. A method according to claim 1, wherein said at least one temperature indicative of the temperature of said at least one fuel cell is an ambient temperature.

3. A method according to claim 1, wherein said at least one temperature indicative of the temperature of said at least one fuel cell is a temperature inside said fuel cell.

4. A method according to claim 1, wherein prior to said step of activating said infeed device, said method comprises the additional step of generating a second control signal that together with said first control signal is configured to activate said infeed device.

5. A method according to claim 4, wherein said step of generating said second control signal is in response to switching off said system such that substantially no electricity is produced.

6. A method according to claim 4, wherein said step of generating said second control signal is in response to a user-defined override.

7. A method according to claim 4, wherein said step of generating said second control signal is in response to a predetermined time of day.

8. A method according to claim 1, wherein said fuel cell system includes a fuel cell stack comprising a plurality of fuel cells.

9. A method according to claim 1, wherein said infeed device is operated during a shutdown period and where said chemical compound substantially displaces the substantial entirety of at least one of said fuel and oxygen that was present in said fuel cell just prior to said shutdown period.

10. A method according to claim 1, comprising the additional step of storing said chemical compound in a supply tank prior to selectively introducing said chemical compound.

11. A method according to claim 10, wherein said supply tank is sized to hold up to approximately ten quarts of said chemical compound when said chemical compound is in liquid form.

12. A method according to claim 10, wherein said supply tank is sized to hold up to approximately one quart of said chemical compound when said chemical compound is in liquid form.

13. A method according to claim 1, wherein said chemical compound is in a vapor phase when introduced to said at least one fuel cell.

14. A method according to claim 1, wherein said chemical compound is in a liquid phase when introduced to said at least one fuel cell.

15. A method according to claim 1, comprising the additional step of pressurizing said chemical compound prior to introducing said chemical compound to said at least one fuel cell.

16. A method according to claim 1, wherein said chemical compound is introduced in an anode flowpath, said anode flowpath configured to establish fluid coupling between said anode and a fuel supply.

17. A method according to claim 16, wherein said chemical compound is mixed with said fuel in said anode flowpath.

18. A method according to claim 1, wherein said chemical compound is introduced in a cathode flowpath, said cathode flowpath configured to establish fluid coupling between said cathode and an oxygen supply.

19. A method according to claim 18, wherein said chemical compound is mixed with said oxygen in said cathode flowpath.

20. A method according to claim 1, further comprising an inert gas supply device in selective fluid communication with at least one of said anode or said cathode such that an inert gas can be introduced into said fuel cell system simultaneously with said chemical compound.

21. A method according to claim 20, wherein said chemical compound is mixed with said inert gas upstream of said anode.

22. A method according to claim 1, wherein said chemical compound is liquid at the normal freezing temperature of said at least one reaction product, but gaseous at a temperature corresponding to said fuel cell system activity.

23. A method according to claim 1, wherein said chemical compound is miscible with water.

24. A method according to claim 23, wherein said chemical compound has a boiling point in the range between approximately 68° F. and approximately 176° F.

25. A method according to claim 24, wherein said chemical compound has a freezing point below approximately −40° F.

26. A method according to claim 1, wherein said chemical compound is selected from the group consisting of alcohols, bases, acids, sugars with at least one functional group and 1 to 20 carbon atoms, and compounds including hydrogen and at least one of carbon and nitrogen.

27. A method according to claim 1, wherein said infeed device is configured to introduce an amount of said chemical compound proportional to the temperature difference between said sensed temperature and said predetermined threshold temperature.

28. A method according to claim 27, wherein the amount of said chemical compound introduced by said infeed device is between approximately one third of an ounce and approximately 350 ounces.

29. A method according to claim 1, wherein said infeed device further comprises a heating device configured to vaporize said chemical compound and produce a chemical compound vapor pressure sufficient to penetrate the substantial entirety of said fuel cell system between the point of said heating device and said respective anode or cathode.

30. A method according to claim 1, comprising the additional step of configuring a compressor to facilitate said introduction of said chemical compound into at least one of said anode flowpath or said cathode flowpath.

31. A method according to claim 30, wherein said compressor is configured to determine an inlet pressure at said anode, and said chemical compound is introduced downstream of said compressor.

32. A method according to claim 30, wherein said compressor is configured to determine an inlet pressure at said cathode, and said chemical compound is introduced downstream of said compressor.

33. A method according to claim 1, further comprising the step of selectively operating an auxiliary compressor configured to supply said oxygen to said fuel cell system such that said auxiliary compressor operates simultaneously with the introduction of said chemical compound into said fuel cell system.

34. A method according to claim 1, further comprising:
an air compressor configured to supply said oxygen to said fuel cell system; and
an auxiliary compressor for supplying an auxiliary air flow to said fuel cell system, said auxiliary air compressor configured to operate during said step of introducing said chemical compound such that said auxiliary air flow and said chemical compound are mixed.

* * * * *